United States Patent [19]

Downing et al.

[11] 4,102,046

[45] Jul. 25, 1978

[54] CUTTING EDGES COATED WITH POLYFLUOROCARBON POLYMER

[75] Inventors: Keith Stanley Downing, Tilehurst; Richard Johnston, Woodley, both of England

[73] Assignee: The Gillette Company, Boston, Mass.

[21] Appl. No.: 793,144

[22] Filed: May 2, 1977

[30] Foreign Application Priority Data

Jun. 5, 1976 [GB] United Kingdom ............... 18652/76

[51] Int. Cl.$^2$ .............................................. B26B 21/54
[52] U.S. Cl. ............................ 30/346.53; 148/6.15 R; 428/422; 427/375
[58] Field of Search ...................... 427/375; 428/422; 30/346.53; 148/6.15 R

[56] References Cited

U.S. PATENT DOCUMENTS

| | | | |
|---|---|---|---|
| 3,224,908 | 12/1965 | Duch et al. ...................... | 148/6.15 R |
| 3,489,595 | 1/1970 | Brown .................................... | 428/422 |
| 3,774,703 | 11/1973 | Sanderson ......................... | 30/346.53 |
| 3,890,109 | 6/1975 | Jones ................................. | 30/346.53 |

*Primary Examiner*—Ralph S. Kendall
*Attorney, Agent, or Firm*—Richard A. Wise; Oistein J. Bratlie; William M. Anderson

[57] ABSTRACT

The present invention is concerned with incorporating bis-(chloroalkyl) vinyl phosphonates in polyfluorocarbon coatings to improve the adhesion of such polyfluorocarbon coatings to cutting edges and especially to razor blade cutting edges, said cutting edges having outer surfaces of alumina, silica, tungsten, titanium, or tantalum.

8 Claims, No Drawings

CUTTING EDGES COATED WITH POLYFLUOROCARBON POLYMER

It is now conventional to provide razor blade cutting edges with a coating of certain polyfluorocarbons, particularly polytetrafluoroethylene (PTFE); the formation of such coatings and suitable polyfluorocarbons therefor are described, for example, in British Specification 906005. Such polymer coatings adhere well to stainless steel and also to a variety of metallic coatings which have been proposed for stainless steel cutting edges, such as platinum/chromium alloys. We have found, however, that when PTFE is applied by conventional techniques to substrates to certain other materials, only very poor and inadequate adhesion is obtained. Specifically there are a number of materials, in particular alumina, silica (quartz), tungsten, titanium and tantalum, which have properties which would make them very suitable for use as razor blade cutting edges or as coatings on steel razor blade cutting edges, but which cannot effectively be used for this purpose because it is not possible, using presently available techniques, to form adherent polyfluorocarbon coatings thereon and such polymer coatings are as essential in obtaining the desirable overall combination of shaving properties as the nature of the underlying metallic structure.

We have now found that satisfactory adhesion of polyfluorocarbon coatings to substrates of alumina, silica (quartz), tungsten titanium or tantalum (hereinafter referred to, for convenience, as "said material") can be obtained by applying the polyfluorocarbon in the usual way together with certain bis-(chloroalkyl) vinyl phosphonates and then sintering the polyfluorocarbon, again in the usual way.

According to the present invention, therefore, there is provided a process for forming a coating of polyfluorocarbon on a substrate of said material, which comprises applying a dilute dispersion of the polyfluorocarbon, which dispersion also contains a bis-(chloroalkyl) vinyl phosphonate of the formula

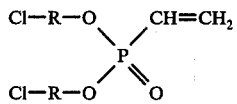

in which each R is an alkylene group with 1 to 4 carbon atoms, to the substrate and drying and sintering the coating formed.

The preferred bis-(chloroalkyl) vinyl phosphonate for use in the method is bis-(chloroethyl) vinyl phosphonate; this is a known compound which is commercially available from Pfaltz and Bauer, Inc., Flushing, New York, U.S.A. The amount of bis-(chloroalkyl) vinyl phosphonate used is suitably from 10 to 136%, preferably 10 to 100%, based on the weight of polyfluorocarbon in the dispersion.

The process according to the invention is, in general, carried out in the same way as conventional polyfluorocarbon coating processes, except that the dispersion also contains bis-(chloroalkyl) vinyl phosphonate. Thus the dispersion preferably contains from 0.9 to 1.2% w/v of polymer solids, though other proportions can be used. The liquid vehicle of the dispersion may be water or a volatile organic liquid, such as a mixture of a major proportion of tert.-butanol and a minor proportion of 1, 1, 2-trifluoro-1, 2, 2-trichloro-ethane (Freon 113). The polyfluorocarbon should be present in the dispersion in finely divided form; preferably the average particle size is about 0.1 m$\mu$.

The dispersion may be applied to the substrate to form a coating thereon in any convenient way; spraying is conveniently used for many forms of substrate including razor blade cutting edges.

We have found that in the process according to the invention (unlike a conventional polyfluorocarbon coating process), best results, in terms of the final adherence of the coating, are obtained if the coating initially formed is allowed to stand for some hours, preferably 24 hours or more, before sintering is carried out.

The sintering conditions used will, of course, depend on the nature of the polyfluorocarbon and can, in general, be the same as those conventionally used. Thus the sintering of PTFE coatings, for example, is preferably effected in a nonoxidizing atmosphere at 350° C for about 15 minutes.

In the specific case of the substrate of said material being a coating on a steel razor blade cutting edge, such a coating may be formed on an already sharpened cutting edge, for example by sputtering, or a thicker coating may be formed, again, for example, by sputtering, on a sharpened or partially sharpened cutting edge and the cutting edge then re-formed or formed, respectively, in the thicker coating of said material. In another specific case the cutting edge may be formed entirely from alumina, silica, tungsten, titanium or tantalum.

In order that the invention may be more fully understood, the following examples are given by way of illustration.

EXAMPLES 1 to 5

Stainless steel razor blades having sputtered coatings of the following materials on their cutting edges: alumina (Example 1), silica (Example 2), tungsten (Example 3), titanium (Example 4), and tantalum (Example 5), were provided with PTFE coatings on their cutting edges as follows:

A stack of the blades was heated in air to 100° C and their cutting edges were sprayed with a dispersion of 1% w/v of PTFE and 1% w/v of bis-(chloroethyl) vinyl phosphonate in a mixture of 90% by volume of tert.-butanol and 10% by volume of 1, 1, 2-trifluoro-1, 2, 2-trichloro-ethane (Freon 113). The amount of dispersion applied to the cutting edges was such that the final coating thickness was 2000–5000Å. After drying, the coatings were sintered in a non-oxidizing atmosphere at a temperature of 350° C for 15 minutes.

The PTFE-coated blades were subjected to cutting instrumentation. For this purpose, samples of the new, freshly coated blades were used to cut through a standard thickness of wet wool felt and the cutting force ($L_5$) required to cut through the felt was measured (in lbs.). The same blades were then used to cut 100 times through the same standard thickness of wet wool felt and the cutting force ($\overline{X}_{100}$) required for the 100th cut was measured (in lbs.). The difference, $\overline{X}_{100} - L_5$ is termed the $\Delta$ value; the lower the $\Delta$ value, the better the adhesion of the PTFE coating. The results obtained are as follows:

| Example | Substrate | $L_5$(lbs.) | $\overline{X}_{100}$(lbs.) | $\Delta$ (lbs.) |
| --- | --- | --- | --- | --- |
| 1 | Alumina | 1.15 | 1.43 | 0.28 |
| 2 | Silica | 1.26 | 1.53 | 0.27 |
| 3 | Tungsten | 1.15 | 1.53 | 0.38 |
| 4 | Titanium | 1.12 | 1.51 | 0.36 |

-continued

| Example | Substrate | $L_5$(lbs.) | $\overline{X}_{100}$(lbs.) | $\Delta$ (lbs.) |
| --- | --- | --- | --- | --- |
| 5 | Tantalum | 1.20 | 1.52 | 0.32 |

The $\Delta$ values shown in the right hand column of this table are entirely satisfactory for commercially acceptable razor blades and are comparable with those obtained by the convention coating of PTFE on stainless steel razor blades (not having any metallic coating on the cutting edges).

When the above-described PTFE coating procedure was repeated, but omitting the bis-(chloroethyl)vinyl phosphonate from the coating dispersion, on stainless steel blades having the same coatings as those of Examples 1 to 5 on the cutting edges, the $\overline{X}_{100}$ cutting force was, in each case, too high to measure (the maximum cutting load which the equipment is designed to accept is 5 lbs.); that is to say, the cutting edges did not survive the 100 cuts.

What is claimed is:

1. A cutting edge having an outer surface of alumina, silica, tungsten, titanium or tantalum, said outer surface being coated with a sintered polyfluorocarbon polymer to which there had been added prior to sintering a bis-(chloroalkyl) vinyl phosphonate selected from the group represented by the formula:

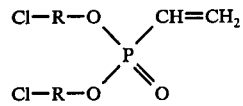

wherein each R is an alkylene group comprising 1 to 4 carbon atoms.

2. A cutting edge as defined in claim 1 wherein said polyfluorocarbon polymer is a polytetrafluoroethylene.

3. A cutting edge as defined in claim 1 which is a razor blade.

4. A cutting edge as defined in claim 2 which is a razor blade.

5. A cutting edge as defined in claim 1 wherein said bis-(chloroalkyl) vinyl phosphonate is bis-(chloroethyl) vinyl phosphonate.

6. A cutting edge as defined in claim 4 wherein said bis-(chloroalkyl) vinyl phosphonate is bis-(chloroethyl) vinyl phosphonate.

7. A cutting edge as defined in claim 1 wherein said bis-(chloroalkyl) vinyl phosphonate is present in amounts varying from about 10 to 136% by weight of said polyfluorocarbon.

8. A cutting edge as defined in claim 4 wherein said bis-(chloroalkyl) vinyl phosphonate is present in amounts varying from about 10 to 136% by weight of said polyfluorocarbon.

* * * * *